(12) United States Patent
Veillet, Jr.

(10) Patent No.: US 6,206,337 B1
(45) Date of Patent: Mar. 27, 2001

(54) AUTOMATIC FLOOD CONTROL BALL VALVE

(75) Inventor: Gaston Veillet, Jr., 85 St. Jean Baptiste, Cap de la Madeleine, QUE (CA), G8T 6T6

(73) Assignee: Gaston Veillet, Jr., Cap de la Madeleine (CA)

( * ) Notice: Subject to any disclaimer, the term of this patent is extended or adjusted under 35 U.S.C. 154(b) by 0 days.

(21) Appl. No.: 09/457,005

(22) Filed: Dec. 8, 1999

(51) Int. Cl.[7] .................................................... F16K 17/36
(52) U.S. Cl. .............................. 251/67; 251/68; 251/74; 251/288; 251/292; 137/78.1
(58) Field of Search .................................. 251/66, 67, 68, 251/74, 78, 129.03, 129.19, 288, 292; 137/78.1, 312

(56) References Cited

U.S. PATENT DOCUMENTS

| | | | |
|---|---|---|---|
| 1,633,813 | * | 6/1927 | Hawley ................................ 251/74 X |
| 1,897,000 | * | 2/1933 | Biery ........................................ 251/68 |
| 2,091,465 | * | 8/1937 | Belknap ............................. 251/74 X |
| 2,114,264 | * | 4/1938 | Heigis ..................................... 251/67 |
| 3,085,781 | * | 4/1963 | Pointe ..................................... 251/67 |
| 3,791,396 | * | 2/1974 | Nelson ............................... 251/68 X |
| 4,261,379 | * | 4/1981 | Berry ................................. 251/68 X |
| 4,324,268 | * | 4/1982 | Jacobson ............................... 137/312 |
| 4,659,063 | * | 4/1987 | Veillette et al. ....................... 251/68 |
| 4,889,313 | * | 12/1989 | Sanchez ................................. 251/74 |
| 4,945,579 | * | 8/1990 | Husting .............................. 251/68 X |
| 5,193,780 | * | 3/1993 | Franklin ................................. 251/68 |
| 5,205,534 | * | 4/1993 | Giordani ..................... 251/129.03 X |
| 5,240,022 | * | 8/1993 | Franklin .......................... 137/78.1 X |
| 5,298,088 | * | 3/1994 | Gray, Jr. .............................. 251/74 X |
| 5,694,970 | * | 12/1997 | Staranchuk ........................... 137/312 |
| 5,813,655 | * | 9/1998 | Pinchott et al. ................. 251/288 X |
| 5,966,076 | * | 10/1999 | Cantrell .............................. 251/68 X |
| 5,967,171 | * | 10/1999 | Dwyer, Jr. ........................... 137/78.1 |
| 6,073,907 | * | 6/2000 | Schreiner, Jr. et al. ..... 251/129.03 X |
| 6,123,093 | * | 9/2000 | D'Antonio et al. ............... 251/67 X |

* cited by examiner

Primary Examiner—Kevin Shaver
Assistant Examiner—Eric Keasel

(57) ABSTRACT

An automatic shutoff valve for shutting off the main water supply to a building in the case of detected water leak. A ball valve is provided with a mounting kit for rendering the valve automatic. The apparatus includes a housing adapted to fit over the valve body and secured directly to the pipes with adjustable clamps. The kit includes a two-section lever member pivotally mounted to the valve. The one-quarter turn movement of the lever member determines the opening and the closing of the valve. A spring-loaded cable and a system of pulleys control the lever member. A retaining member is pivotally mounted to the floor of the housing and a pair of arms extends outwardly therefrom with one arm of the retaining member engaging a slot in the upper end of the internal section of the lever member to retain the valve in the opened position. The retaining member has a second arm extending in the direction opposite to the first arm and is connected to a solenoid device which can be actuated to pivot the retaining member to disengage the slot of the lever from the latch of the retaining member allowing the extension spring to close the valve. A manual closing device is also provided to disengage the slot of the lever without the action of the solenoid device. Once the internal section of the lever is at the closed position, an indicator-switch monitors a signal confirming the closing of the valve.

8 Claims, 4 Drawing Sheets

AUTOMATIC FLOOD CONTROL BALL VALVE

BACKGROUND OF THE INVENTION

1. Field of the Invention

The present invention relates to an automatic flood control valve apparatus and more particularly to an improved mechanism for closing a normally open ball valve in a water supply system.

2. Description of the Prior Art

There are many systems for automatically controlling a valve to interrupt the flow of different fluids and particularly the water supply in the event that flooding occurs due a leak somewhere in a water system. For instance, U.S. Pat. Nos. 5,966,076, Cantrell, Oct. 12, 1999; U.S. Pat. No. 5,694,970, Staranchuck, Dec. 9, 1997; U.S. Pat. No. 5,298,088, Gray, Jr. Mar. 29, 1994; U.S. Pat. No. 5,240,022, Franklin, Aug. 31, 1993; U.S. Pat. No. 5,193,780, Franklin, Mar. 16, 1993; U.S. Pat. No. 4,889,313 Sanchez, Dec. 26, 1989; U.S. Pat. No. 4,659,063 Veillette, Apr. 21, 1987; U.S. Pat. No. 4,324, 268, Jacobson, Apr. 13, 1982. all show a normally opened valve provided in a fluid system as water, gas or air system. Sensors for detecting a leak are linked to an electrical circuit for operating a solenoid for moving a plunger which operates the valve to close it. The valve must be manually reset in order to reopen the valve.

SUMMARY OF THE INVENTION

It is an aim of the present invention to provide an adapter kit for rendering a ball valve operational as an automatic shut off valve. An important particularity of ball valve consists to the high rotational force initially necessary to open the valve and inversely to terminate its closing movement. The friction between the valve ball and the valve seals requires this high level of rotational force. The present invention will permit to adapt a kit specifically designed to eliminate this difficulty by providing an improved and inexpensive automatic shut off valve. A construction in accordance with the present invention comprises an apparatus for rendering as an automatic shut off valve, a ball valve with a lever member which includes an external portion extending axially outside the housing by a circular aperture and adapted to fit over the upper end of the internal portion of the lever member. The external portion of the lever member can be outwardly separated from the internal portion of the lever member to avoid eventual obstruction upon the closing movement of the valve.

A spring-loaded cable is secured to the internal lever member and provides it the sufficient torque to move one-quarter turn in a closing position. The cable passes by a system of three pulleys with the two first pulleys mounted on the base of the housing. The third pulley which is a moving pulley is fixed on one end of an extension spring which has its other end attached on an anchor-plate mounted on the base of the housing. The end of the cable, after passing around the third pulley, is secured to an anchor-base of the housing.

A valve latch mechanism is provided by a slot located in the upper end of the internal portion of the lever member and a retaining member pivotally mounted onto the base of the housing. A pair of arms extends outwardly from the retaining member with one arm engaging the slot of the lever member to retain the valve in the opened position. The second arm of the retaining member extends in the opposite position and is connected to the plunger of a solenoid device. When the solenoid is activated, the plunger is pulled downwardly thereby allowing the retaining member to release the internal portion of the lever member which, being constantly in a taut condition because the action of the spring-loaded cable, rotates one-quarter turn for the closing of the valve. The amount of rotation is restricted to 90 degrees by a stopper means having a switch to remote a signal confirming the complete closure of the valve. A compression spring is coiled around the plunger and permits the retaining member to resume its initial position after an unlatching operation.

A manual closing device permitting to close the valve without the activation of the solenoid is secured to the base of the housing and includes an horizontal guide having at one end a wall with a circular aperture and containing a compression spring coiled around a pushrod.

A shoulder on the pushrod supports the coil spring which is pressed against the wall of the guide. The pushrod has a sliding movement inside the guide and extends outwardly both sides of the guide. The guide is coaxially aligned with both the plunger of the solenoid and an aperture in the housing. Thus, one end of the pushrod extends axially towards the exterior of the housing and a force applied on it results in a direct pressure against the end of the retaining member, which is secured to the upper end of the plunger of the solenoid. Consequently, the pivoting action of the retaining member releases instantly the lever member which closes instantly the valve. Thus, the pressure is removed on the pushrod which retracts its initial position being pushed by the coil spring.

The housing of the apparatus is screwed to the base and a circular aperture in the middle of the base permits its positioning on the valve body. Two special adaptors corresponding to the size of the pipe and adapted to the dimensions of the valve are intended to be used with two adjustable clamps.These adaptors permit the lever member to be coaxially aligned with the latch mechanism. One of the advantages of the present invention is that the housing can be mounted to the most conventional ball valves. It is merely necessary to replace the handle by a lever member and secure the kit directly on the pipes with the adjustable clamps. The shut off assembly can be supplied, therefore, as a kit to adapt existing systems.

BRIEF DESCRIPTION OF THE DRAWINGS

Having thus generally described the nature of the invention, reference will now be made to the accompanying drawings showing by way of illustration, the preferred embodiments thereof, and in which.

DESCRIPTION OF THE PREFERRED EMBODIMENT

Figure 1:
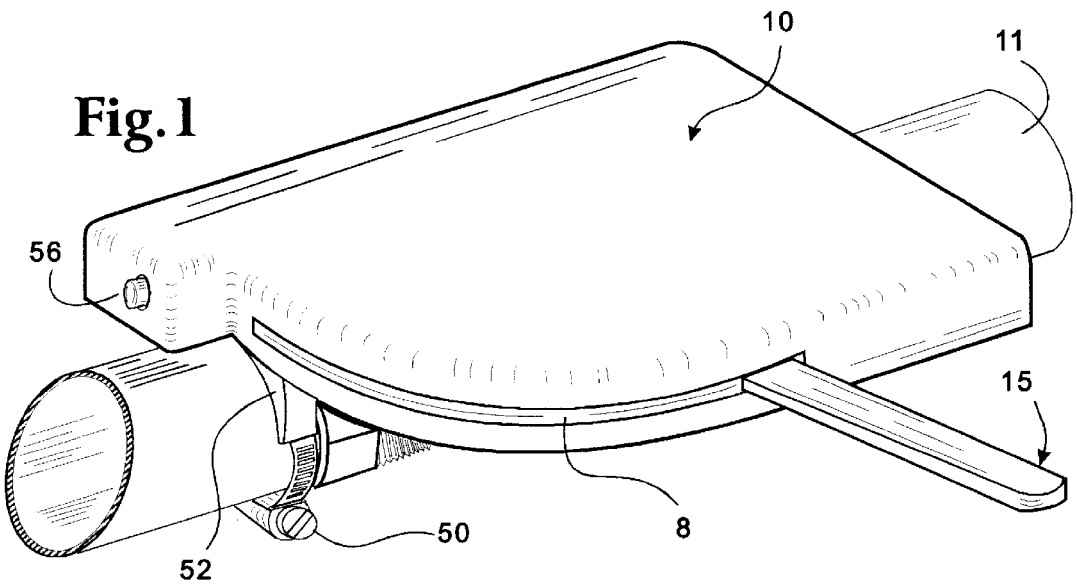
FIG. 1 is a perspective elevational view of an automatic shut off valve with the lever member in the closed position in accordance with the present invention.
Figure 2:
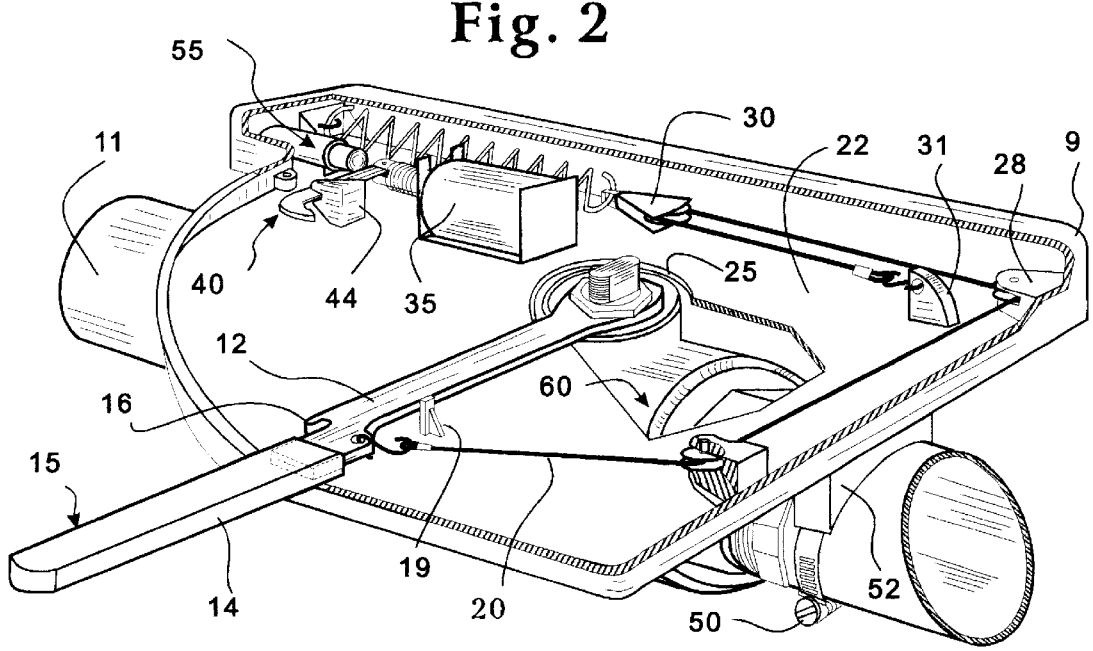
FIG. 2 is a perspective longitudinal cross-section through the shut off valve shown in FIG. 1 illustrated in the closed position.
Figure 3:
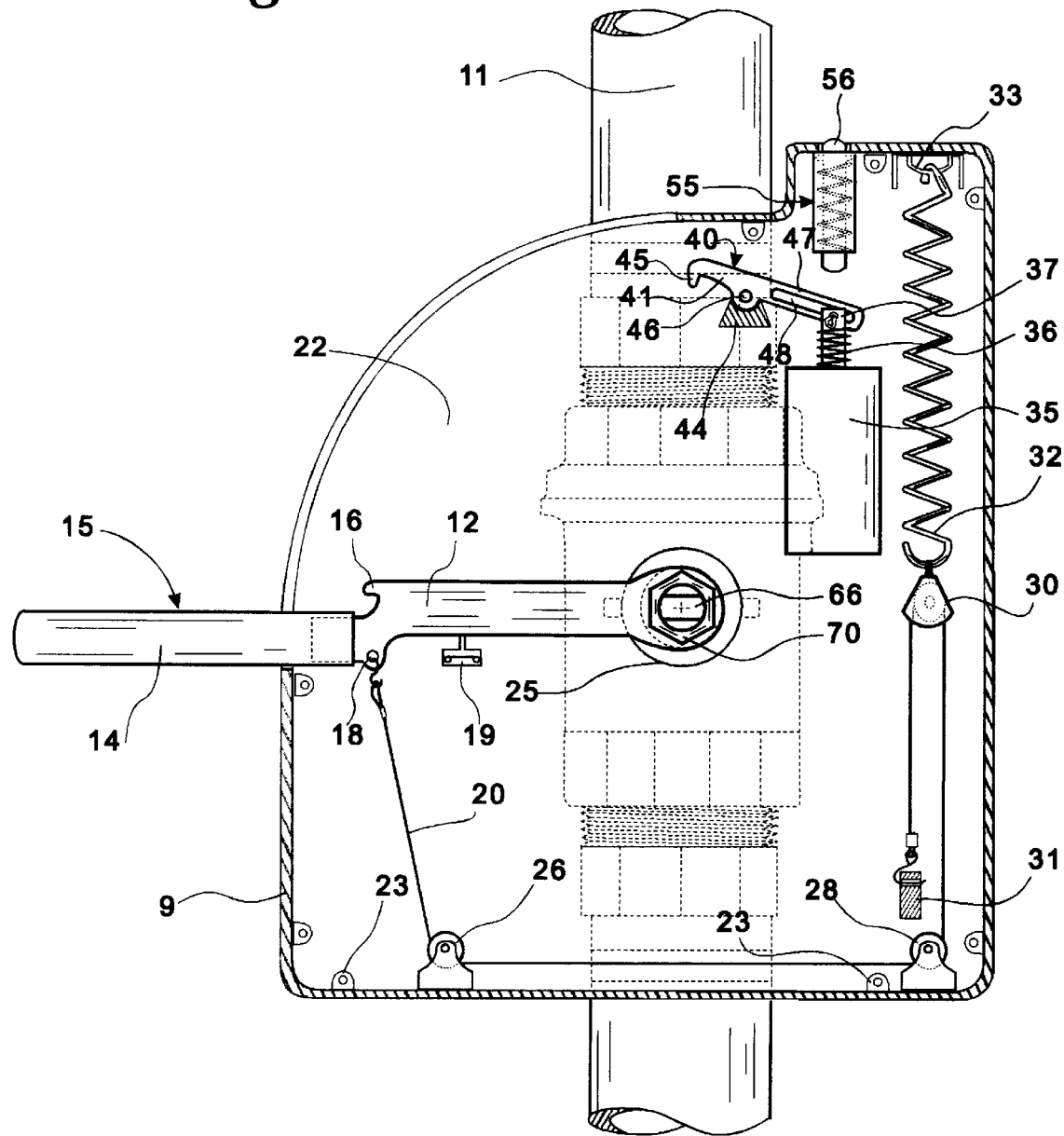
FIG. 3 is a plan longitudinal cross-section view of the shut off valve system illustrated in the closed position.
Figure 5:
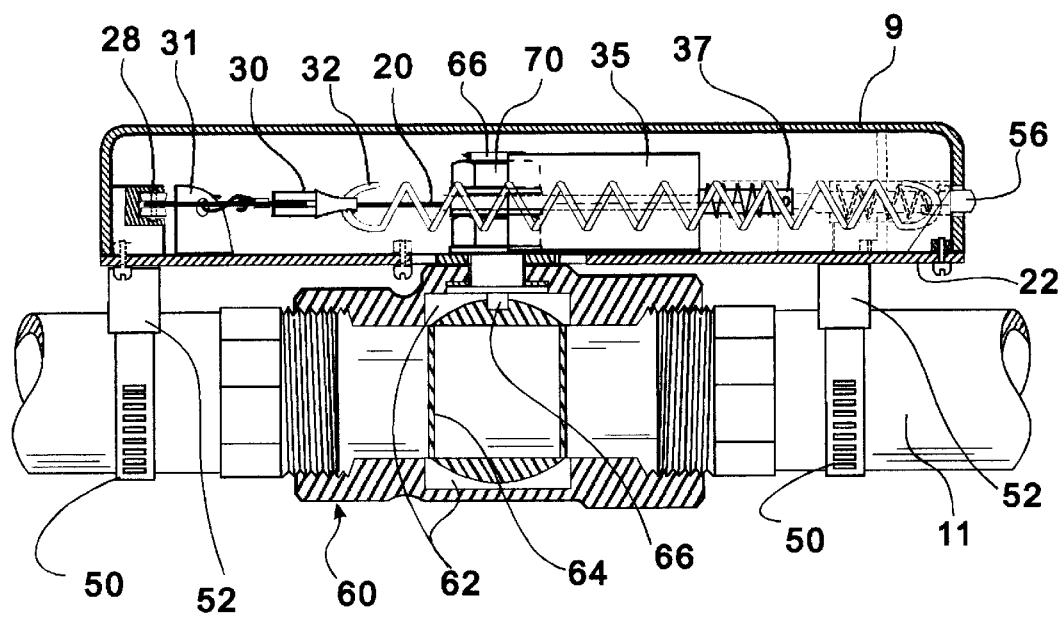
FIG. 5 is a transversal cross-section view illustrating the structures of the components of the ball valve assembly and the shut off valve system.

Referring now to the drawings, an automatic shut off valve device 10 is shown mounted on a typical ball valve 60 which interrupts a water line 11. As show in FIG. 5, the friction between the valve ball 64 and the valve seals 62 create the high rotational force initially necessary to open the valve and inversely to close it. The spring-loaded cable as described later will overcome this characteristic. The shut off valve device 10 includes a housing 9, which is fixed to a base 22 with screw- brackets 23. A circular aperture 25 located in the middle of the base 22 permits to fit the assembly on the valve body 60 allowing the top portion of the valve 60 which includes the stem-nuts 70 and the upper end of the stem 66 to extend inwardly the housing 9. The entire kit is mounted on two special adaptors 52 which are secured directly on the pipes 11 with two adjustable clamps 50. Different sizes of adaptors 52 can be custom fitted thereto to adjust various sizes of pipes 11. Both adaptors 52 are adjusted to horizontally align a lever member 15 with the retaining device 40. FIGS. 2 and 3 show the lever member 15 which is provided by an external portion 14 and an internal portion 12 which is secured to the valve 60 with the stem-nut 70. The lever member replaces the original handle provided by the valve manufacturer.

As best shown in FIG. 3, the upper section of the internal portion of the lever member 12 has a longitudinal slot 16, which engages the latch 45 of the retaining member 40. An eyelet 18 is transversally opposed to the slot 16. An external portion of the lever member 14 extends outwardly the internal portion of the lever member 12 through a circular aperture 8 in the housing 9. A male-female connection permits to join both portions of the lever member 15.

Figure 4:
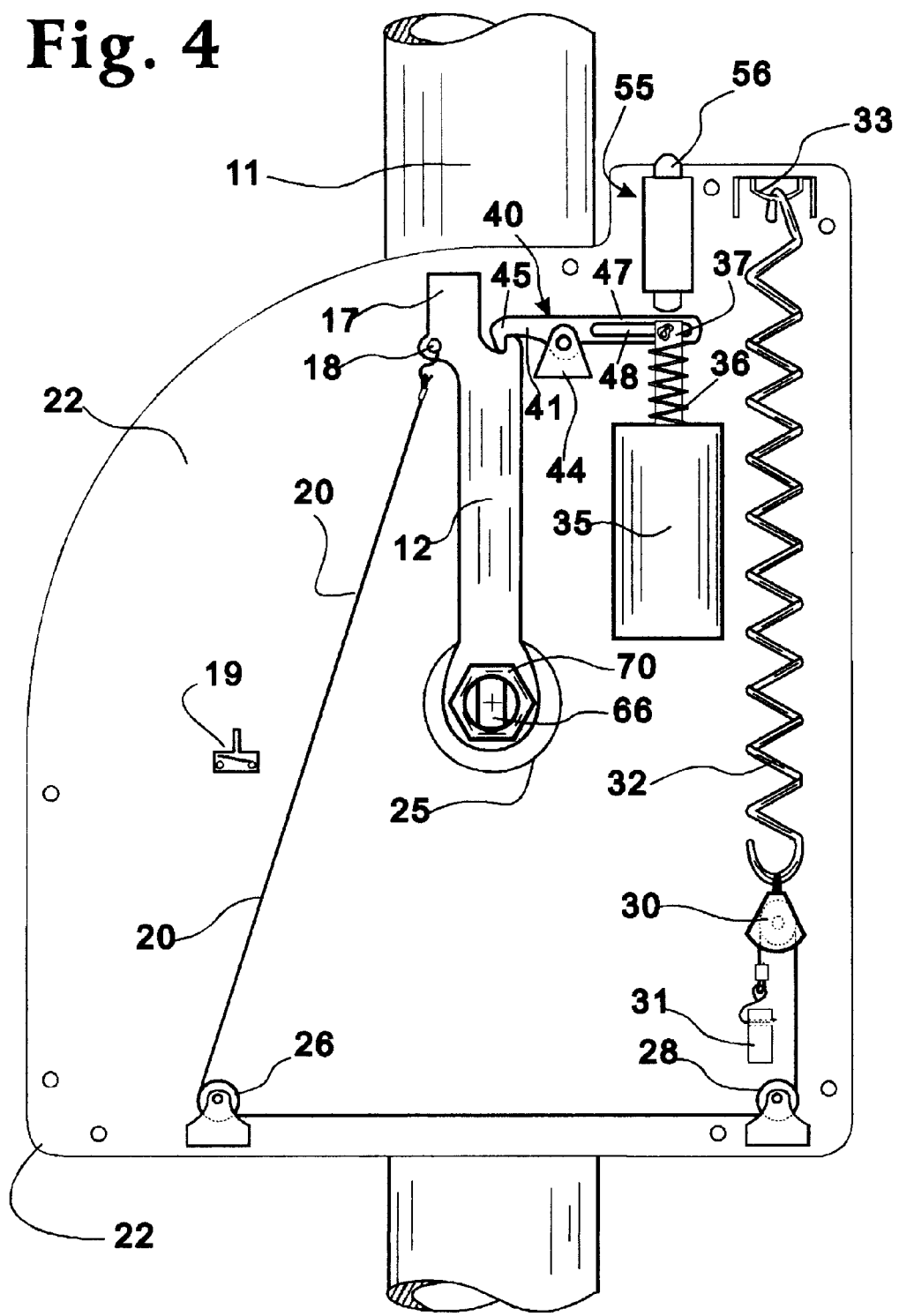
FIG. 4 is a plan view of the shut off valve system illustrated in the opened position without the housing and with the external portion of the lever removed.

As sown in FIG. 4, the internal portion of lever member includes an extending portion 17 profiled as the male connection, which fits to the end of the external portion 14 of the lever member. This portion 17 is longitudinally offset from the axis of the internal portion of the lever member 12 to prevent a structural weakening peripheral to the slot 16 and the eyelet 18. The spring-loaded cable and pulleys assembly provides the stretching energy to rotate the stem 66 until the closed position of the valve is reached at which time the ball valve 64 firmly seats against the ball seals 62. FIG. 3 shows the shut off valve system in a full closed position. A cable 20 attached to the eyelet 18 passes over a first pulley 26 mounted biased to the base 22 in a way to impose a minimum holding power to the retaining member 40 but permitting the spring-cable to apply sufficient torque energy to start the closing rotational movement of the lever member 12. The second pulley 28, mounted transversely to the base 22 permits the cable to align perpendicularly the moving pulley 30 which is secured directly to the end of the extension spring 32. Thus, the cable 20 passes around the moving pulley and is finally fastened to an anchor-base 31 mounted to the base 22. The other end of the extension spring 32 is secured to the anchor-plate 33 fixed to the base 22.

Even in a full closed position, the spring cable system exerts a tension on the lever member 12 to fully overcome the friction between the ball valve 64 and the ball seals 62 upon the closure movement. To reset the valve in its open position, it is necessary to manually rotate the lever member 15 a quarter-turn in a clockwise direction. Consequently, the extension spring 32 stretches and the slot 16 of the internal portion of the lever member 12 engages the latch 45 of the retaining device 40, which is pivotally mounted in the pivot bracket 44 fixed on the base 22. The retaining device 40 is pivotally mounted about the stub shaft 46, which represents the pivot point. The retaining device 40 includes a first arm 41 which has a latch 45 adapted to engage the slot 16 of the internal portion of the lever member 12. A second arm 47 in a direction opposite to the arm 41, has a lost motion slot 48. A solenoid 35 is provided with a plunger 37 connected to the arm 47 by means of the lost motion slot 48. Finally, a compression spring 36 is coiled axially around the plunger 37. The automatic shut off valve is normally utilized in the environment of a flood control device which would include sensors (not shown) communicating electronically with a control circuit (not shown) activating the solenoid valve. As discussed in prior patent, U.S. Pat. Nos. 4,324,268, Jacobson, Apr. 13, 1982, the solenoid 35 would be activated when a sensor device detects floor water within the area being surveyed. Once the control circuit activates the solenoid 35, the plunger 37 is retracted into the solenoid housing has shown in FIG. 3. and forces the retaining device 40 to rotate clockwise about the pivot point 46 thus disengaging the latch 45 from the slot 16 of the lever member 12. The lever member 12 during its retained position, that is the open valve position, rotates in a counterclockwise direction towards a closing position. As the latch 45 is disengaged from the slot 16, the spring-loaded cable forces the lever member 12 to rotate 90 degrees to the closed position thus shutting off the flow. A switch-stopper 19 limits the rotational movement of the lever member 12 to 90 degrees and remotes a signal confirming the fully closed condition of the valve.

Figure 6:
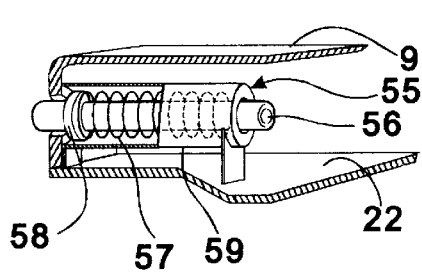
FIG. 6 is a perspective vertical cross-section through the manual closing device in a waiting position.
Figure 7:
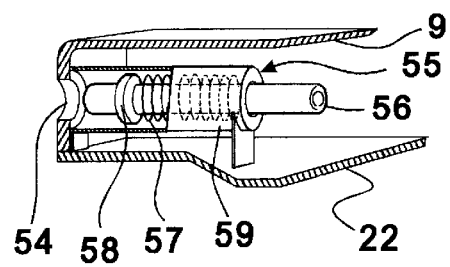
FIG. 7 is a perspective vertical cross-section through the manual closing device in an operating position.

Because a manual operation only may reopen the valve, this arrangement prevents an accidental resetting of the valve in the event the flood water has evaporated and as well, allows for a positive retaining of the device with positive displacement of the lever 15 when the retaining device 40 is withdraw. As best shown in FIG. 6 and FIG. 7, a manual closing device counted to the base 22 includes aide 59 and a pushrod 56 axially coiled by a spring 57. The pushrod 56 extends outwardly on both sides of the guide 59. One end of the guide 59 has a wall with a circular aperture which permits the sliding movement of the pushrod 56 outside the guide body 59 whereas the other end of the guide 59 is fully opened and allows the pushrod 56 to extend outwardly the housing 9 by an aperture 54 aligned with the pushrod 56. A shoulder 58 on the pushrod 56 compresses the coil spring 57 against the opposite wall of the guide 59 and permits the pushrod 56 to retract after a manual closing. The shoulder 58 limits also the portion of the pushrod 56 projecting outwardly of the guide 59 and the aperture 54 of the housing 9. Upon the assembly of the shut off valve, the pushrod 56 must be retained inside the guide 59 while the housing 9 is secured at its proper location. Afterward, the pressure created by the spring 57 on the shoulder 58, allows the pushrod 56 to retract automatically and extend outside the housing 9 by the aperture 54.

As best shown in FIGS. 6 and 7, the pushrod 56 extends the wall of the housing 9. A pressure applied on the pushrod 56 is directly transmitted on the arm 47 of the retaining device 40. Thus, the retaining device 40, pivots about the pivot point 46 and unlatches the lever member 12.

Furthermore, the automatic shut off valve device 10, in accordance with the present invention, can be mounted on most any ball valve. It is merely necessary to replace the handle of an existing ball valve with a lever member such as the lever member 15. The shut off valve device 10 is then placed over the existing ball valve and secured on the pipes 11 by means of the adaptors 52 and the adjustable clamps 50.

I claim:

1. An apparatus for rendering as an automatic shut-off valve, a ball valve with a spring-loaded cable assembly and a system of pulleys, the apparatus comprising:

a housing adapted to fit over a body of said ball valve;

said housing secured directly to pipes connected to said ball valve with a pair of adaptors designed to fit on said pipes;

said housing containing said spring-loaded cable assembly and said system of pulleys;

said spring-loaded cable assembly is fixed to a lever member and provides sufficient torque to move said lever member one-quarter turn in a closing direction;

said spring-loaded cable assembly comprising a cable secured to said lever member and passing over first and second pulleys mounted on a base of said housing and passing around a third, moving pulley;

said moving pulley is secured to one end of an extension spring which urges said lever member to pivot one-quarter turn;

said cable, after passing around said moving pulley is fixed on an anchor base;

said extension spring having the end opposite from the moving pulley attached to an anchor plate fixed on the base of said housing;

said lever member having a slot engaging a latch of a retaining member;

said retaining member being pivotally mounted on the base of the housing and including a first member extending horizontally from a pivot point and adapted to engage the slot of said lever member and to retain said lever member in an opened position against the urging of the extension spring;

said retaining member including a second arm which extends horizontally in the opposite direction of said first member;

said second arm connected to a solenoid means whereby the retaining member is pivoted to disengage the first member of the retaining member from the slot of the lever member to allow the spring-loaded cable to rotationally move the lever member in a closing direction;

a switch-stopper restricting the rotational movement of said lever member to 90 degrees and remoting a signal to confirm the fully closed condition of the ball valve;

a manual closing device secured to the base of said housing and providing a pushrod surrounded by a coil spring and sliding in a guide;

said pushrod having one end extending axially outside said housing and the other end facing the second arm of the retaining member whereby the disengaging of the first member of said retaining member from said slot of said lever member allows the closing of the valve.

2. An apparatus as defined in claim 1, wherein the housing is directly to the pipes with said adaptors;

said adaptors corresponding to the size of said pipes which are connected to the ball valve.

3. An apparatus as defined in claim 1, wherein the adaptors are designed to align horizontally the lever member and the retaining member of said ball valve.

4. An apparatus as defined in claim 1, wherein said lever member of said ball valve has a slot which engages the first member of the retaining member to manually reset the ball valve to the opened position.

5. An apparatus as defined in claim 1, wherein said second arm of said retaining member includes a lost motion slot connecting said retaining member to a plunger of the solenoid means with a compression spring coiled around said plunger for normally urging said retaining member to the slot of said lever member.

6. An apparatus as defined in claim 1, wherein said lever member has an external portion which may be separated from the internal portion of said lever member when the ball valve is opened.

7. An apparatus as defined in claim 1, wherein said spring-loaded cable assembly has said cable secured to an eyelet of said lever member and said cable passes over the first pulley fixed to the base of the housing and said cable passes over the second pulley transversely opposed and fixed to said base of said housing and said cable turns perpendicularly and passes around a third pulley and attaches to the anchor base of said housing.

8. An apparatus as defined in claim 1, wherein the manual closing device has said pushrod surrounded by the coil spring and sliding in the guide to urge said second arm of said retaining member to disengage said first arm of said retaining member form said slot of said lever member.

* * * * *